United States Patent [19]
Drummer

[11] Patent Number: 6,046,400
[45] Date of Patent: Apr. 4, 2000

[54] SOLAR POWER SUPPLY SYSTEM

[76] Inventor: Lennier Drummer, 1834 S. 14th Ave., Broadview, Ill. 60153

[21] Appl. No.: 09/238,925

[22] Filed: Jan. 28, 1999

[51] Int. Cl.$^7$ .................................................. H01L 31/042
[52] U.S. Cl. ........................... 136/244; 136/291; 136/293; 323/906
[58] Field of Search .................................... 136/291, 293, 136/244; 320/149; 290/50; 307/66; 323/906

[56] References Cited

U.S. PATENT DOCUMENTS

| | | | |
|---|---|---|---|
| 4,315,163 | 2/1982 | Bienville | 307/66 |
| 4,718,233 | 1/1988 | Barrett | 60/496 |
| 4,728,878 | 3/1988 | Anthony | 322/2 |
| 4,742,291 | 5/1988 | Bobier et al. | 320/39 |
| 4,982,569 | 1/1991 | Bronicki | 60/698 |
| 5,216,972 | 6/1993 | Dufrene et al. | 114/218 |
| 5,253,150 | 10/1993 | Vanni | 362/183 |
| 5,293,892 | 3/1994 | Fourqurean | 137/3 |
| 5,366,604 | 11/1994 | Stilley | 204/196 |
| 5,692,647 | 12/1997 | Brodie | 222/173 |

*Primary Examiner*—Nam Nguyen
*Assistant Examiner*—Michael C Miggins

[57] ABSTRACT

A solar power supply system for providing alternating current for energizing an alternating current appliance from energy derived from solar power. The solar power supply system includes a plurality of photovoltaic cells electrically connected to a battery and a power inverter for converting direct current into alternating current. The power inverter is electrically connected to at least one electrical receptacle to supply alternating current to the electrical receptacle. A second alternating current supply is also electrically connected to the electrical receptacle. A switch electrically connects the power inverter to the electrical receptacle in a first mode and electrically connecting the second alternating current supply to the electrical receptacle in a second mode. A voltage comparator is electrically connected to the photovoltaic cells to compare a predetermined reference voltage to the direct current supply by the photovoltaic cells. The voltage comparator is also electrically connected to the switch. The switch is in the first mode when the voltage comparator detects the direct current supply from the photovoltaic cells is greater than the predetermined reference voltage. The switch is in the second mode when the voltage comparator detects the direct current supply from the photovoltaic cells is less than the predetermined reference voltage.

14 Claims, 3 Drawing Sheets

SOLAR POWER SUPPLY SYSTEM

BACKGROUND OF THE INVENTION

1. Field of the Invention

The present invention relates to solar power supply systems and more particularly pertains to a new solar power supply system for providing alternating current (AC) for energizing an alternating current appliance from energy derived from solar power.

2. Description of the Prior Art

The use of solar power supply systems is known in the prior art. More specifically, solar power supply systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,224,082; U.S. Pat. No. 4,808,904; U.S. Pat. No. Des. 288,089; U.S. Pat. No. 5,522,943; U.S. Pat. No. 4,106,952; and U.S. Pat. No. 2,962,539.

While these devices fulfill their respective, particular objectives and requirements, the aforementioned patents do not disclose a new solar power supply system. The inventive device includes a plurality of photovoltaic cells electrically connected to a battery and a power inverter for converting direct current into alternating current. The power inverter is electrically connected to at least one electrical receptacle to supply alternating current to the electrical receptacle. A second alternating current supply is also electrically connected to the electrical receptacle. A switch electrically connects the power inverter to the electrical receptacle in a first mode and electrically connecting the second alternating current supply to the electrical receptacle in a second mode. A voltage comparator is electrically connected to the photovoltaic cells to compare a predetermined reference voltage to the direct current supply by the photovoltaic cells. The voltage comparator is also electrically connected to the switch. The switch is in the first mode when the voltage comparator detects the direct current supply from the photovoltaic cells is greater than the predetermined reference voltage. The switch is in the second mode when the voltage comparator detects the direct current supply from the photovoltaic cells is less than the predetermined reference voltage.

In these respects, the solar power supply system according to the present invention substantially departs from the conventional concepts and designs of the prior art, and in so doing provides an apparatus primarily developed for the purpose of providing alternating current (AC) for energizing an alternating current appliance from energy derived from solar power.

SUMMARY OF THE INVENTION

In view of the foregoing disadvantages inherent in the known types of solar power supply systems now present in the prior art, the present invention provides a new solar power supply system construction wherein the same can be utilized for providing alternating current (AC) for energizing an alternating current appliance from energy derived from solar power.

The general purpose of the present invention, which will be described subsequently in greater detail, is to provide a new solar power supply system apparatus and method which has many of the advantages of the solar power supply systems mentioned heretofore and many novel features that result in a new solar power supply system which is not anticipated, rendered obvious, suggested, or even implied by any of the prior art solar power supply systems, either alone or in any combination thereof.

To attain this, the present invention generally comprises a plurality of photovoltaic cells electrically connected to a battery and a power inverter for converting direct current into alternating current. The power inverter is electrically connected to at least one electrical receptacle to supply alternating current to the electrical receptacle. A second alternating current supply is also electrically connected to the electrical receptacle. A switch electrically connects the power inverter to the electrical receptacle in a first mode and electrically connecting the second alternating current supply to the electrical receptacle in a second mode. A voltage comparator is electrically connected to the photovoltaic cells to compare a predetermined reference voltage to the direct current supply by the photovoltaic cells. The voltage comparator is also electrically connected to the switch. The switch is in the first mode when the voltage comparator detects the direct current supply from the photovoltaic cells is greater than the predetermined reference voltage. The switch is in the second mode when the voltage comparator detects the direct current supply from the photovoltaic cells is less than the predetermined reference voltage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar power supply system apparatus and method which has many of the advantages of the solar power supply systems mentioned heretofore and many novel features that result in a new solar power supply system which is not anticipated, rendered obvious, suggested, or even implied by any of the prior art solar power supply systems, either alone or in any combination thereof.

It is another object of the present invention to provide a new solar power supply system which may be easily and efficiently manufactured and marketed.

It is a further object of the present invention to provide a new solar power supply system which is of a durable and reliable construction.

An even further object of the present invention is to provide a new solar power supply system which is susceptible of a low cost of manufacture with regard to both materials and labor, and which accordingly is then susceptible of low prices of sale to the consuming public, thereby making such solar power supply system economically available to the buying public.

Still yet another object of the present invention is to provide a new solar power supply system which provides in the apparatuses and methods of the prior art some of the advantages thereof, while simultaneously overcoming some of the disadvantages normally associated therewith.

Still another object of the present invention is to provide a new solar power supply system for providing alternating current (AC) for energizing an alternating current appliance from energy derived from solar power.

Yet another object of the present invention is to provide a new solar power supply system which includes a plurality of photovoltaic cells electrically connected to a battery and a power inverter for converting direct current into alternating current. The power inverter is electrically connected to at least one electrical receptacle to supply alternating current to the electrical receptacle. A second alternating current supply is also electrically connected to the electrical receptacle. A switch electrically connects the power inverter to the electrical receptacle in a first mode and electrically connecting the second alternating current supply to the electrical receptacle in a second mode. A voltage comparator is electrically connected to the photovoltaic cells to compare a predetermined reference voltage to the direct current supply by the photovoltaic cells. The voltage comparator is also electrically connected to the switch. The switch is in the first mode when the voltage comparator detects the direct current supply from the photovoltaic cells is greater than the predetermined reference voltage. The switch is in the second mode when the voltage comparator detects the direct current supply from the photovoltaic cells is less than the predetermined reference voltage.

Still yet another object of the present invention is to provide a new solar power supply system that has a switch for providing energy from a second alternating current power supply when there is not enough light to provide sufficient energy above a predetermined level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
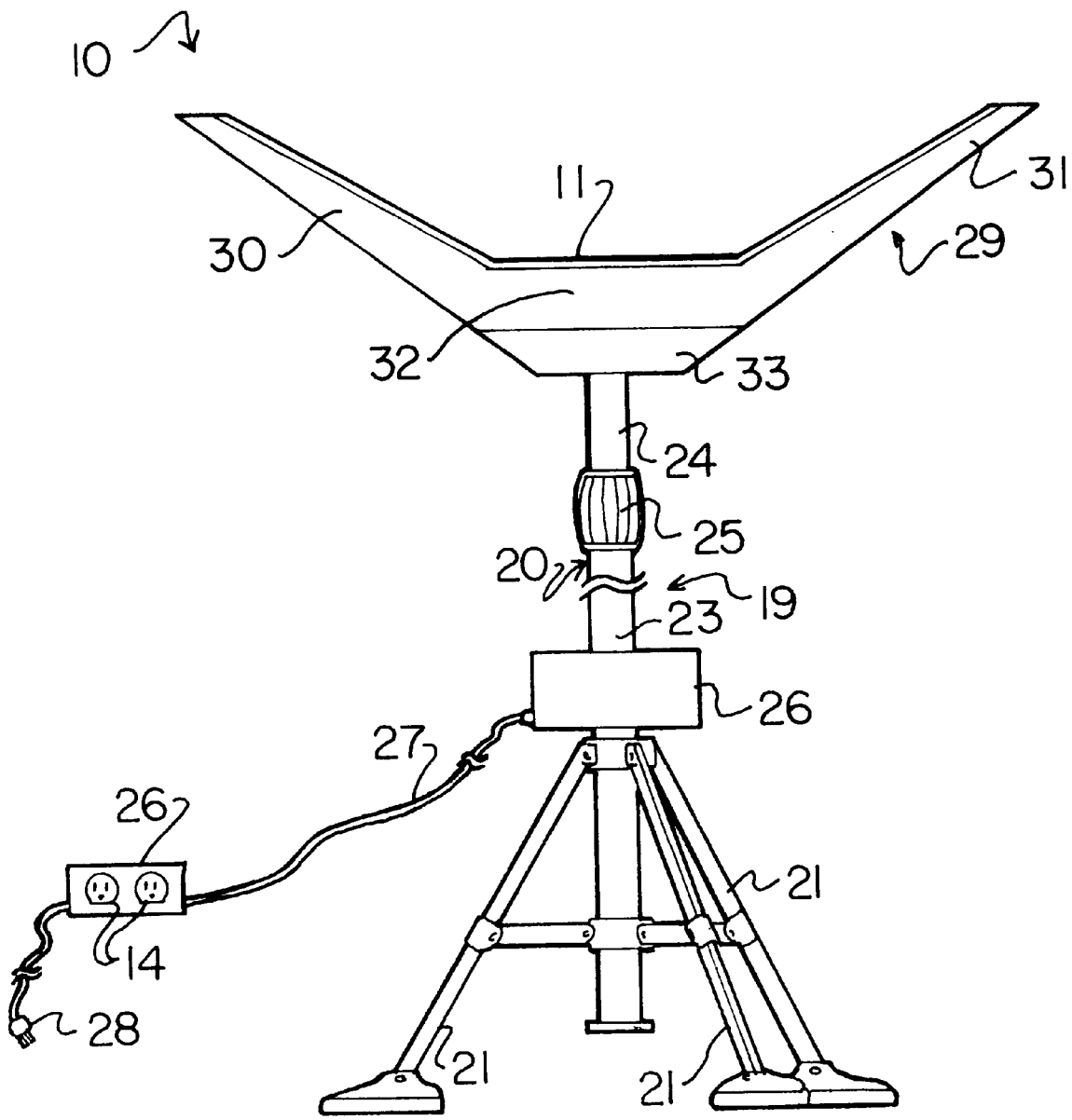
FIG. 1 is a schematic side view of a preferred embodiment new solar power supply system according to the present invention.

With reference now to the drawings, and in particular to FIGS. 1 through 4 thereof, a new solar power supply system embodying the principles and concepts of the present invention and generally designated by the reference numeral 10 will be described.

As best illustrated in FIGS. 1 through 4, the solar power supply system 10 generally comprises a plurality of photovoltaic cells electrically connected to a battery and a power inverter for converting direct current into alternating current. The power inverter is electrically connected to at least one electrical receptacle to supply alternating current to the electrical receptacle. A second alternating current supply is also electrically connected to the electrical receptacle. A switch electrically connects the power inverter to the electrical receptacle in a first mode and electrically connecting the second alternating current supply to the electrical receptacle in a second mode. A voltage comparator is electrically connected to the photovoltaic cells to compare a predetermined reference voltage to the direct current supply by the photovoltaic cells. The voltage comparator is also electrically connected to the switch. The switch is in the first mode when the voltage comparator detects the direct current supply from the photovoltaic cells is greater than the predetermined reference voltage. The switch is in the second mode when the voltage comparator detects the direct current supply from the photovoltaic cells is less than the predetermined reference voltage.

In use, the power supply system is designed for supplying alternating current (AC) to an alternating current appliance using radiant energy from light from the sun. In closer detail, the power supply system 10 comprises a plurality of photovoltaic cells 11 for converting radiant energy from a light source into direct current (DC) electrical energy. A battery 12 is provided for storing electrical energy. The photovoltaic cells are electrically connected to the battery for supplying direct current to recharge the battery. A power inverter 13 is also provided for converting direct current into alternating current. The photovoltaic cells are electrically connected to the power inverter to supply direct current to the power inverter.

At least one electrical receptacle 14 is provided for receiving a plug of an alternating current electrical appliance therein, the power inverter is electrically connected to the electrical receptacle to supply alternating current to the electrical receptacle. A second alternating current supply 15, such as the alternating current supply of the building, is also electrically connected to the electrical receptacle for supplying alternating current to the electrical receptacle.

A switch 16 electrically connects the power inverter to the electrical receptacle in a first mode and electrically connects the second alternating current supply to the electrical receptacle in a second mode. A voltage comparator 17 is electrically connected to the photovoltaic cells to compare the direct current supply by the photovoltaic cells to a predetermined reference voltage 18. The voltage comparator is electrically connected to the switch.

In use, the switch is in the first mode to supply alternating current from the power inverter when the voltage comparator detects that the direct current supply from the photovoltaic cells is greater than the predetermined reference voltage. When the voltage comparator detects that the direct current supply from the photovoltaic cells is less than the predetermined reference voltage, the switch is in the second mode to supply alternating current from the secondary alternating current power supply.

With reference to FIG. 1, in a preferred embodiment, a tripod stand 19 is provided having an elongate shaft 20 and a plurality of legs 21. The shaft of the stand has opposite upper and lower ends and a longitudinal axis extending between the upper and lower ends of the shaft. Preferably, the shaft of the stand is telescopically extendable in a direction along the longitudinal axis of the shaft. In this preferred embodiment, the shaft of the stand has upper and lower telescopic portions 22,23. Ideally, the upper telescopic portion of the shaft is telescopically inserted into the lower telescopic portion of the shaft. In this ideal embodiment, the shaft has a locking nut 24 disposed therearound releasably holding the upper telescopic portion of the shaft in a fixed position with respect to the lower telescopic portion of the shaft. In an ideal embodiment, the shaft of the stand should be extendable to a length of at least five feet between the upper and lower ends of the shaft.

The battery is preferably provided in a rectangular box-shaped casing 25 mounted to the lower telescopic portion of the shaft. The electrical receptacle is preferably provided in a power bar 26 having an elongate flexible cable 27 connecting the power bar to the casing of the battery. The power bar also has a plug 28 for electrically connecting the electrical receptacle to the second alternating current power supply.

Preferably, the legs of the stand are slidably mounted to the shaft of the stand to permit positioning of the legs in a deployed position and a retracted position. The legs of the stand are extended at an acute angle to the longitudinal axis of the shaft when the legs are positioned in the deployed position. In use, as illustrated in FIG. 1, the legs of the stand are designed for resting on a resting surface so that the longitudinal axis of the shaft is extended substantially perpendicular to the resting surface when the legs are positioned in the deployed position. When the legs are positioned in the retracted position, the legs of the stand are extended generally parallel to the longitudinal axis of the shaft for convenient storage and transport of the stand.

A solar collector 29 is provided having a spaced apart pair of side panels 30,31 and a middle panel 32 connecting the side panels of the collector together. The photovoltaic cells are provided on upper surfaces of the middle and side panels of the collector. The middle panel of the collector is coupled to the upper end of the shaft of the stand so that, preferably, the middle panel generally lies in a plane substantially perpendicular to the longitudinal axis of the shaft. Optionally, the middle panel of the collector may be pivotally coupled to the upper end of the shaft to permit adjustment of the angle between the longitudinal axis of the shaft and the plane of the middle panel of the collector. The power inverter is preferably provided in a housing 33 coupled to a lower surface of the middle panel for providing easy access and transport of the power inverter with the stand and collector.

Preferably, the side panels of the collector generally lie in planes each extending at obtuse angle to the plane of the middle panel of the collector. Even more preferably, the obtuse angle between one of the side panels and the middle panel of the collector is about equal to the obtuse angle between the other side panel and the middle panel of the collector. Ideally, the obtuse angles between the side panels and the middle panel of the collector are each between about 140 degrees and about 150 degrees for providing an optimal orientation for exposing the photovoltaic cells to an optimal amount of sunlight during the daytime.

The middle panel of the collector has a width defined between the side panels of the collector. The side panels of the collector each have a length defined outwardly from the middle panel of the collector. Preferably, the lengths of the side panels of the collector is about equal to one another for providing an optimal size for exposing the photovoltaic cells to an optimal amount of sunlight during the daytime. In this preferred embodiment, the width of the middle portion of the collector is less than the length of one of the side panels of the collector.

The side panels of the collector each have a thickness defined between upper and lower surfaces of the respective side panel. Similarly, the middle panel of the collector has a thickness defined between upper and lower surfaces of the middle panel. Preferably, the thickness of the middle panel is greater than the thickness of either side panel. Ideally, the thickness of each side panel tapers in a direction extending away from the middle panel so that the weight and center of gravity of the collector is located close to the upper end of the shaft of the stand and away from the free ends of the side panels.

Figure 2:
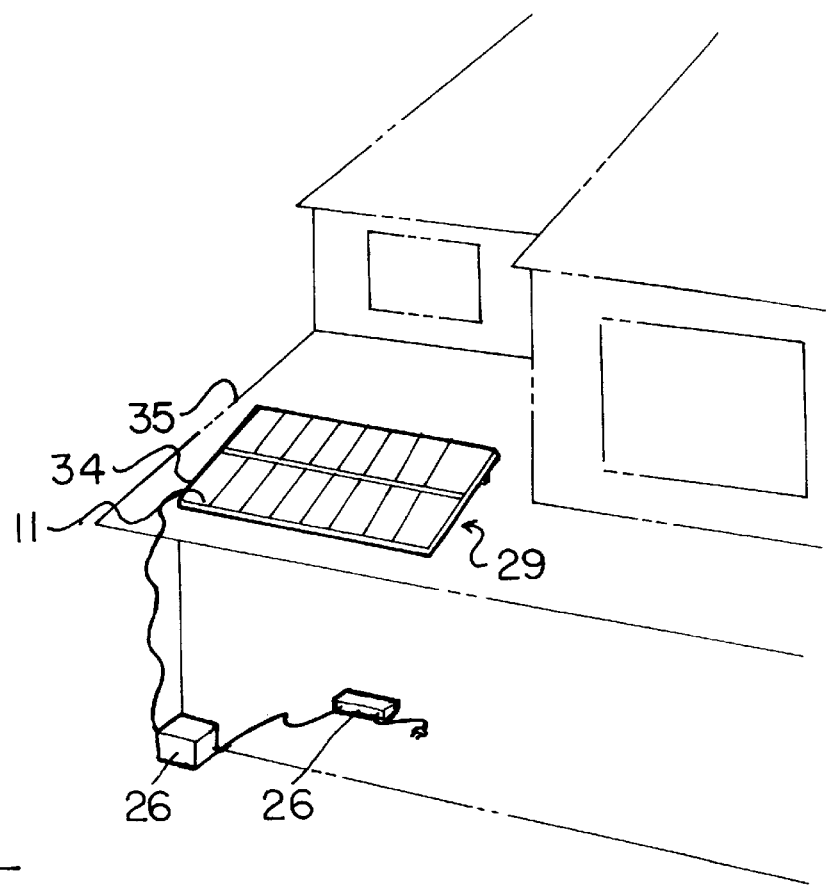
FIG. 2 is a schematic perspective view of an optional embodiment of the present invention.
Figure 3:
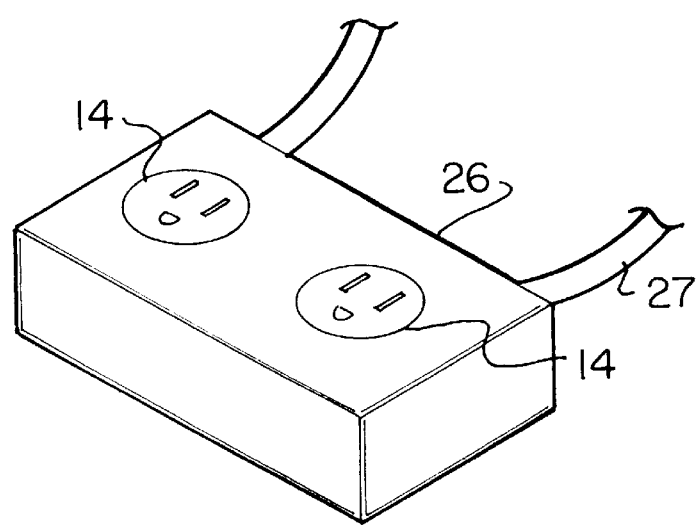
FIG. 3 is an enlarged schematic perspective view of a pair of electrical receptacles in a power bar.
Figure 4:
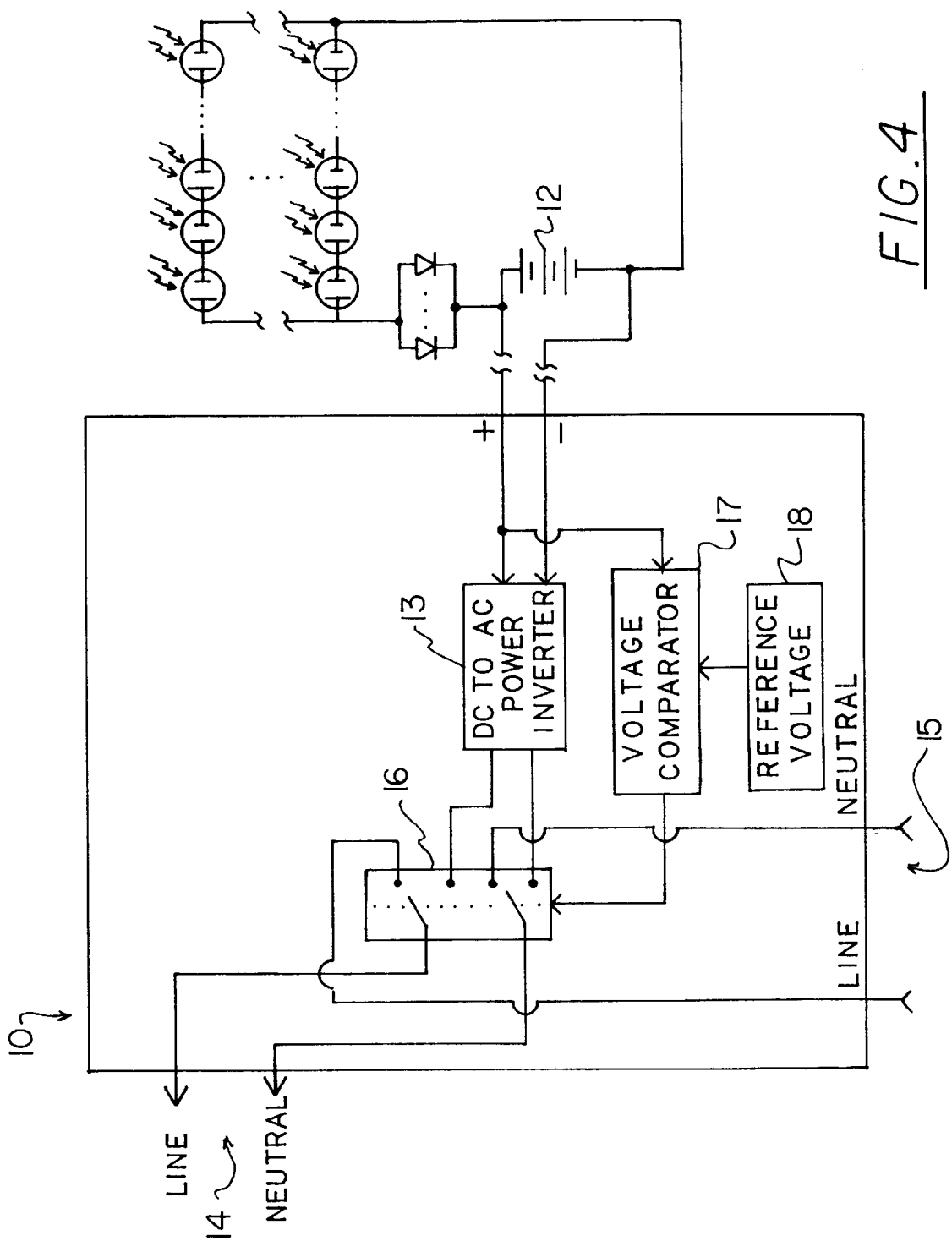
FIG. 4 is an electrical schematic of the present invention.

With reference to FIG. 2, in an optional stationary embodiment, the collector may comprise a plurality of rectangular panels 34 mounted to the roof 35 of a structure instead of being mounted to the upper end of a shaft of a stand.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A power supply system, comprising: a plurality of photovoltaic cells for converting radiant energy into direct current;

a battery, said photovoltaic cells being electrically connected to said battery for supplying direct current to recharge said battery;

a power inverter for converting direct current into alternating current, said photovoltaic cells being electrically connected to said power inverter to supply direct current to said power inverter;

an electrical receptacle, said power inverter being electrically connected to said electrical receptacle to supply alternating current to said electrical receptacle;

a second alternating current supply being electrically connected to said electrical receptacle for supplying alternating current to said electrical receptacle;

a switch electrically connecting said power inverter to said electrical receptacle in a first mode and electrically connecting said second alternating current supply to said electrical receptacle in a second mode;

a voltage comparator being electrically connected to said photovoltaic cells, said voltage comparator comparing a predetermined reference voltage to the direct current supply by said photovoltaic cells;

said voltage comparator being electrically connected to said switch;

said switch being in said first mode when said voltage comparator detects the direct current supply from said photovoltaic cells is greater than said predetermined reference voltage; and said switch being in said second mode when said voltage comparator detects the direct current supply from said photovoltaic cells is less than said predetermined reference voltage.

2. The power supply system of claim 1, further comprising a stand having an elongate shaft and a plurality of legs, said shaft of said stand having opposite upper and lower ends, and a longitudinal axis extending between said upper and lower ends of said shaft, and wherein said battery is provided in a rectangular box-shaped casing mounted to said shaft.

3. The power supply system of claim 2, wherein said shaft of said stand is telescopically extendable in a direction along said longitudinal axis of said shaft.

4. The power supply system of claim 3, wherein said shaft of said stand has upper and lower telescopic portions, said upper telescopic portion of said shaft being telescopically inserted into said lower telescopic portion of said shaft, wherein said shaft has a locking nut disposed therearound releasably holding said upper telescopic portion of said shaft in a fixed position with respect to said lower telescopic portion of said shaft, and wherein said casing of said battery is positioned on said lower telescopic portion of said shaft.

5. The power supply system of claim 2, wherein said electrical receptacle is provided in a power bar having an elongate flexible cable electrically connecting said power bar to said battery.

6. The power supply system of claim 5, wherein said power bar has a plug for electrically connecting said electrical receptacle to said second alternating current power supply.

7. The power supply system of claim 2, wherein said legs of said stand are slidably mounted to said shaft of said stand to permit positioning of said legs in a deployed position and a retracted position, said legs of said stand being extended at an acute angle to the lower end of said shaft when said legs are positioned in said deployed position, said legs of said stand being adapted for resting on a resting surface such that said longitudinal axis of said shaft is extended substantially perpendicular to the resting surface when said legs are positioned in said deployed position, and wherein said legs of said stand are extended parallel to said longitudinal axis of said shaft when said legs are positioned in said retracted position.

8. The power supply system of claim 1, further comprising a solar ray collector having a trough shape and having a spaced apart pair of side panels and a middle panel connecting said side panels of said collector together, wherein said photovoltaic cells are provided on upper surfaces of said middle and side panels of said collector.

9. The power supply system of claim 8, further comprising a stand having an elongate shaft and a plurality of legs, said shaft of said stand having opposite upper and lower ends, and a longitudinal axis extending between said upper and lower ends of said shaft, wherein said middle panel of said collector is coupled to said upper end of said shaft of said stand.

10. The power supply system of claim 9, wherein said middle panel lies in a plane perpendicular to said longitudinal axis of said shaft.

11. The power supply system of claim 9, wherein said middle panel of said collector is pivotally coupled-to said upper end of said shaft.

12. The power supply system of claim 8, wherein said power inverter being provided in a housing coupled to a lower surface of said middle panel.

13. The power supply system of claim 8, wherein said side panels of said collector each extend at an obtuse angle to said middle panel of said collector.

14. A power supply system, comprising:

a plurality of photovoltaic cells for converting radiant energy into direct current;

a battery, said photovoltaic cells being electrically connected to said battery for supplying direct current to recharge said battery;

a power inverter for converting direct current into alternating current, said photovoltaic cells being electrically connected to said power inverter to supply direct current to said power inverter;

an electrical receptacle for receiving a plug of an electrical appliance therein, said power inverter being electrically connected to said electrical receptacle to supply alternating current to said electrical receptacle;

a second alternating current supply being electrically connected to said electrical receptacle for supplying alternating current to said electrical receptacle;

a switch electrically connecting said power inverter to said electrical receptacle in a first mode and electrically connecting said second alternating current supply to said electrical receptacle in a second mode;

a voltage comparator being electrically connected to said photovoltaic cells, said voltage comparator comparing a predetermined reference voltage to the direct current supply by said photovoltaic cells;

said voltage comparator being electrically connected to said switch;

said switch being in said first mode when said voltage comparator detects the direct current supply from said photovoltaic cells is greater than said predetermined reference voltage;

said switch being in said second mode when said voltage comparator detects the direct current supply from said photovoltaic cells is less than said predetermined reference voltage;

a stand having an elongate shaft and a plurality of legs;

said shaft of said stand having opposite upper and lower ends, and a longitudinal axis extending between said upper and lower ends of said shaft;

said shaft of said stand being telescopically extendable in a direction along said longitudinal axis of said shaft;

said shaft of said stand having upper and lower telescopic portions, said upper telescopic portion of said shaft being telescopically inserted into said lower telescopic portion of said shaft;

said shaft having a locking nut disposed therearound releasably holding said upper telescopic portion of said shaft in a fixed position with respect to said lower telescopic portion of said shaft;

said battery being provided in a rectangular box-shaped casing mounted to said lower telescopic portion of said shaft;

said electrical receptacle being provided in a power bar having an elongate flexible cable electrically connecting said power bar to said battery;

said power bar having a plug for electrically connecting said electrical receptacle to said second alternating current power supply;

said legs of said stand being slidably mounted to said shaft of said stand to permit positioning of said legs in a deployed position and a retracted position;

said legs of said stand being extended at an acute angle to the lower end of said shaft when said legs are positioned in said deployed position;

said legs of said stand being adapted for resting on a resting surface such that said longitudinal axis of said shaft is extended perpendicular to the resting surface when said legs are positioned in said deployed position;

said legs of said stand being extended parallel to said longitudinal axis of said shaft when said legs are positioned in said retracted position;

a solar ray collector having a trough shape and having a spaced apart pair of side panels and a middle panel connecting said side panels of said collector together;

said photovoltaic cells being provided on upper surfaces of said middle and side panels of said collector;

said middle panel of said collector being coupled to said upper end of said shaft of said stand;

said middle panel lying in a plane perpendicular to said longitudinal axis of said shaft;

wherein said middle panel of said collector is pivotally coupled to said upper end of said shaft;

said power inverter being provided in a housing coupled to a lower surface of said middle panel;

said side panels of said collector each extending at an obtuse angle to said middle panel of said collector;

wherein the obtuse angle between one of said side panels and said middle panel of said collector is equal to the obtuse angle between the opposite side panel and said middle panel of said collector;

wherein said obtuse angles between said side panels and said middle panel of said collector are each between about 140 degrees and 150 degrees;

said middle panel of said collector having a width defined between said side panels of said collector, said side panels of said collector each having a length defined outwardly from said middle panel of said collector;

said lengths of said side panels of said collector being equal to one another;

said width of said middle portion of said collector being less than said length of one of said side panels of said collector;

said side panels of said collector each having a thickness defined between upper and lower surfaces of the respective side panel;

said middle panel of said collector having a thickness defined between upper and lower surfaces of said middle panel;

said thickness of said middle panel being greater than the thickness of either side panel; and said thickness of each side panel tapering in a direction extending away from said middle panel.

* * * * *